Feb. 1, 1949.  W. C. TRAUTMAN  2,460,774
VALVE
Filed Sept. 18, 1943  2 Sheets-Sheet 1
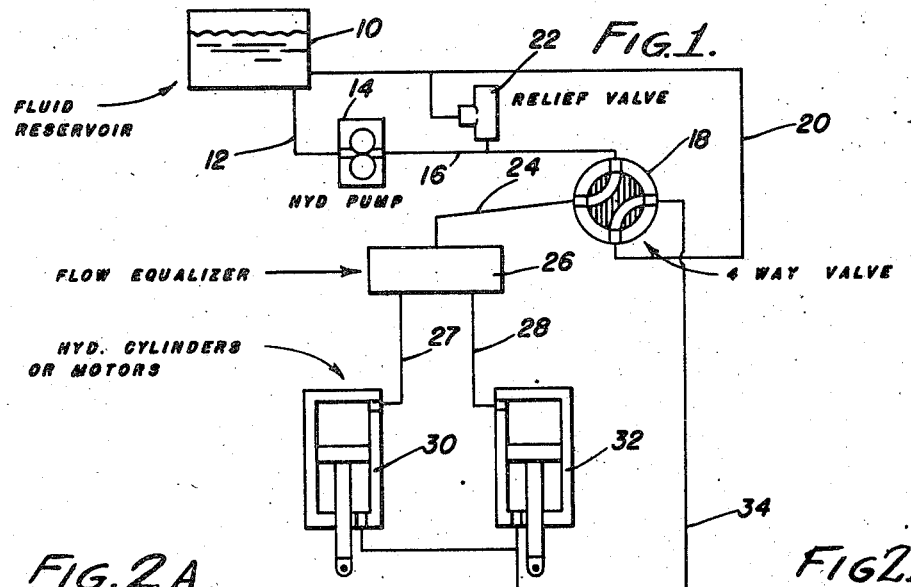
FIG.1.
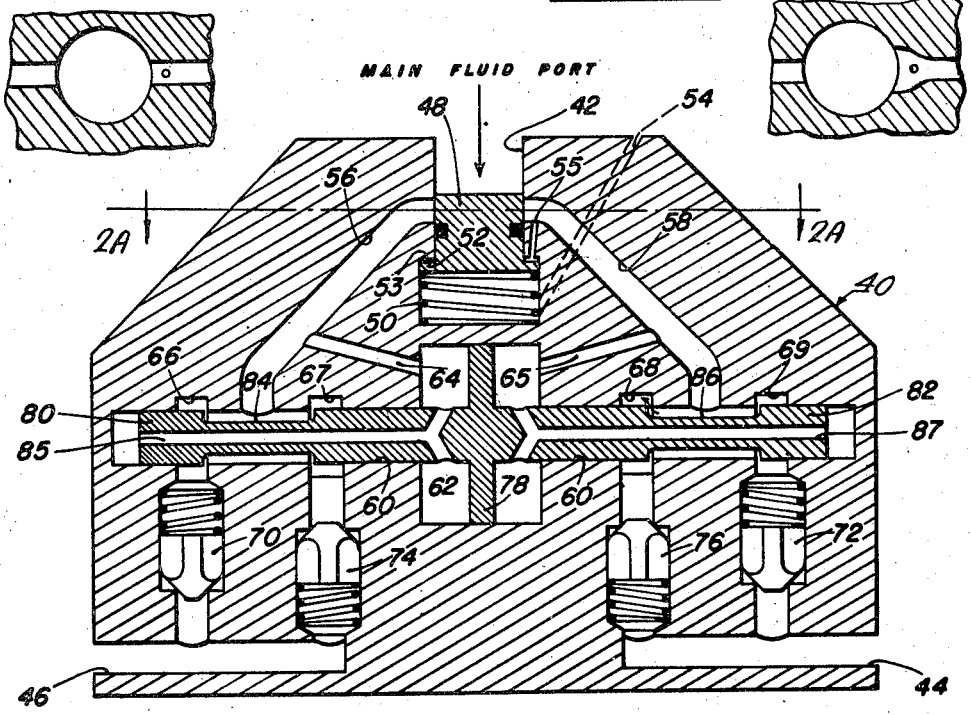
FIG.2A.   FIG.2B.
FIG 2
INVENTOR.
WALTER G. TRAUTMAN
BY H. W. Brelsford
ATTORNEY Feb. 1, 1949.  W. C. TRAUTMAN  2,460,774
VALVE
Filed Sept. 18, 1943  2 Sheets-Sheet 2
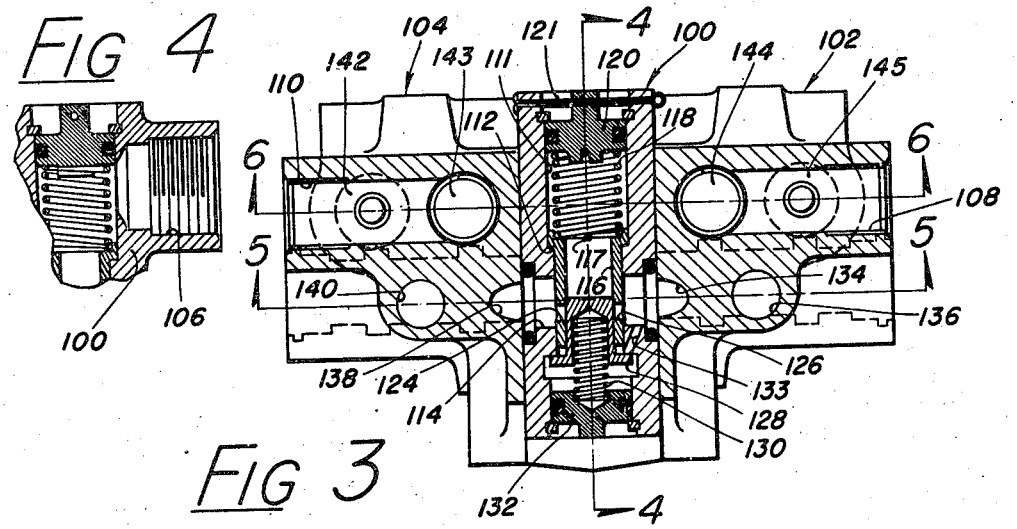
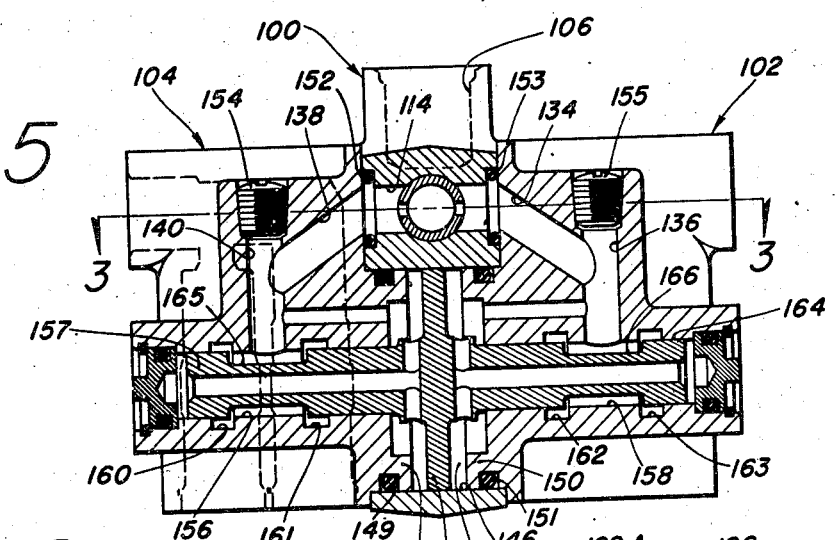
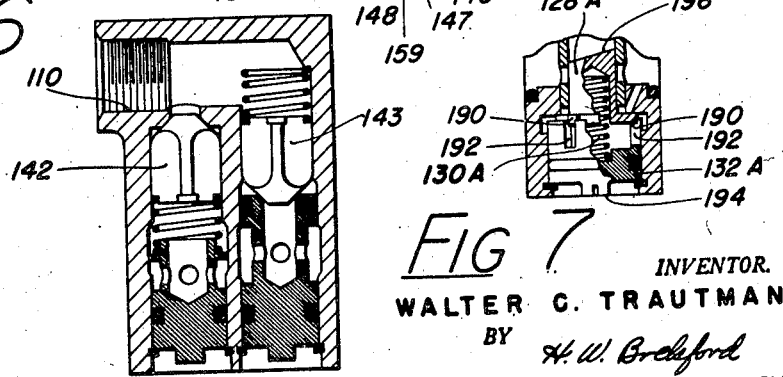
INVENTOR.
WALTER C. TRAUTMAN
BY
ATTORNEY Patented Feb. 1, 1949

2,460,774

UNITED STATES PATENT OFFICE 2,460,774

VALVE

Walter C. Trautman, North Hollywood, Calif., assignor, by mesne assignments, to Bendix Aviation Corporation, South Bend, Ind., a corporation of Delaware Application September 18, 1943, Serial No. 502,877

9 Claims. (Cl. 137—165)

This invention relates to equalizer valves for equalizing the flow to a plurality of outlets when supplied from a single source. More particularly, the invention relates to a reversible equalizer valve which will not only divide a fluid flow equally, but will combine several flows into a single stream in equal quantities, both functions being independent of the load or force against which the flow acts or which acts on the flow in the reverse direction.

Equalizer valves are useful in many applications. They may be used to divide a fluid flow into two or more equal parts for measuring or mixing purposes. In fluid power systems, as in machinery operated by pneumatic or hydraulic fluid under pressure, it may be desirable to have two remote motors move at the same rate of speed. When the power fluid is incompressible, such as hydraulic fluid, equalizer valves can be made to equalize the rate of speed of two remote motors, regardless of the relative loads imposed upon them.

Equalizer valves are also useful in airplanes wherein hydraulic fluid acts in actuating cylinders to move devices. It is often desirable to have a plurality of items actuated at the same rate of speed. This is particularly true where the actuated devices might aerodynamically unbalance the airplane by unequal speeds of movement. For example, the uneven retraction of landing gear, or the closing of gear doors or bomb bay doors might seriously affect the airplane when there are unequal loads upon them, as in a cross wind. The most serious problem of equal actuation in airplanes is the flaps. If these are extended or retracted unevenly during landings or take-offs, they might unbalance the airplane sufficiently to cause a crash. Accordingly, it is common practice to inter-connect the flaps by cables running through pulleys. The costly and weighty construction is eliminated by the present invention wherein a single valve may equalize flap movement on both extension and retraction.

Equalizer valves are well known in the fluid actuation art. Nearly all such devices are unidirectional, however; that is, they divide a flow equally, or they combine equal flows. Very few valves both combine and divide equally, and those that have been available to the public are unsatisfactory. The advantage of such a device is that one valve can do the work normally requiring two valves. Thus, the present invention can divide flow equally to two actuating cylinders and can recombine liquid flows in equal amounts, which results in equal movement in both directions, since hydraulic fluid is incompressible for practical consideration. Under the most severe condition, when there is full load on one hydraulic motor, and no load on the other, the present invention will operate with 98% accuracy.

It is therefore an object of the invention to provide a reversible equalizer valve capable of dividing or combining flows equally.

Another object of the invention is to provide a reversible equalizer valve which operates with a high degree of accuracy.

It is an object of the invention to provide a reversible equalizer valve which is simple in construction, lending itself to inexpensive and high quantity production, and simplifying service.

Other objects and advantages of the invention will be apparent in the following description and claims considered in connection with the accompanying drawings.

In the drawings forming a part of this specification:

Figure 1 is a diagram of a hydraulic system in which the invention is employed;

Figure 2 is a schematic section of the valve to show the parts and their function;

Fig. 2A is a cross section taken in the plane 2A—2A of Fig. 2;

Fig. 2B is a cross section taken in the same plane as Fig. 2A, showing a modified construction;

Figure 3 is a plan view, partly in section, of the commercial version of the valve;

Figure 4 is a fragmentary view in full section along the line 4—4 of Figure 3;

Figure 5 is an elevation view in full section along the lines 5—5 of the valve of Figure 3;

Figure 6 is an elevation view of one group of check valves, in full section, taken along the line 6—6 of the valve of Figure 3; and Figure 7 is a plan view in full section of a modification of the variable orifice means shown in Figure 3.

Referring to Figure 1, hydraulic liquid is stored in a reservoir 10, to which is connected a conduit 12 delivering liquid to the inlet of a power driven pump 14. Pump 14 delivers liquid under pressure to a conduit 16 leading to a four-way valve 18. Also connected to valve 18 is a conduit 20 leading back to reservoir 10 to return exhaust liquid. When the fluid demand is such that flow through the valve is less than the delivery of the pump, delivery fluid is bypassed to the reservoir through a relief valve 22. Leading from valve 18 is a conduit 24 connected to an equalizer valve 26 forming the invention. From valve 26 conduits 27 and 28 lead to hydraulic actuating cylinders 30 and 32 respectively. These actuating cylinders, or hydraulic motors, may be used for any purpose such as retracting and extending flaps or landing gear. Connected to the bottom of cylinders 30 and 32 is a bifurcated conduit 34 connected to four-way valve 18. In the position shown, valve 18 directs fluid under pressure to equalizer valve 26 where the flow is divided equally between cylinders 30 and 32, and the exhaust flow passes through conduit 34 to valve 18, and through conduit 20 to reservoir 10. In the other position of valve 18, fluid under pressure is directed into conduit 34, passing into the lower ends of cylinders 30 and 32. Exhaust flow passes through conduits 27 and 28 to equalizer valve 26 where the flow is combined in equal quantities to direct it through conduit 24 to exhaust.

The valve of this invention is shown in schematic outline in Figure 2. A valve body 40 has a main fluid port 42, and two branch ports 44 and 46. Placed in port 42 is a piston 48 urged upwardly by a spring 50, the upward movement being restrained by a piston flange 52 engaging an internal shoulder 53. When the fluid pressure overcomes the force of spring 50, the piston 48 will be forced downwardly and the piston moves freely because of a vent 54 to atmosphere from the bottom of main port 42.

Branching from either side of main port 42 are branch conduits 56 and 58 connecting to opposite ends of a transverse bore 60 having an enlarged portion 62. The intersection area of passages 56 and 58 with port 42 are closed varying amounts by piston 48, and these intersections will therefore be described as variable orifices. Passages 64 and 65 connect passages 56 and 58 respectively to opposite sides of chamber 62. On both sides of the entrance of passages 56 and 58 into bore 60 are annular enlargements 66, 67, 68 and 69, the outside two having check valves 70 and 72 connected thereto to stop flow from bore 60, and the inside two having check valves 74 and 76 permitting flow from bore 60. Each pair of check valves communicates with branch ports 44 and 46 respectively.

Placed in enlarged bore 62 is a piston 78 dividing the chamber. Secured to piston 78 are valve rods 80 and 82, having reduced portions 84 and 86 slightly greater in length than the distance between adjacent edges of annular recess pairs 66, 67 and 68, 69. Formed in rods 80 and 82 are holes 85 and 87 communicating the end of the rod with the chamber 62. These holes allow the fluid at the rod ends to escape as the rods are moved.

The operation of the valve of Figure 2 is as follows: Assuming that fluid under pressure is applied to port 42, the piston 48 will be forced downwardly, uncovering passages 56 and 58 an equal amount. If the flow through each passage is equal, there will be an equal pressure drop through the entrance at piston 48, and these pressures will prevail in the entire valve, balancing the parts and presenting equal resistance to each flow. The advantage of the variable orifice formed by piston 48 is that it enlarges at greater flows because the pressure will be greater, but still it restricts the orifice for small flows to give a pressure drop. This advantage of a drop producing orifice which is satisfactory under all flow conditions cannot be realized with a fixed orifice.

Assuming now that one liquid consuming cylinder has a greater load than the other, it will not consume as much liquid as the other cylinder. The flow into its passage, for example passage 56, will be less and the pressure drop will be less, increasing the pressure in passage 56 over that in passage 58. These respective pressures will be transmitted to chamber 62 through passages 64 and 65. Since one pressure is greater than the other, piston 78 and rods 80 and 82 will move toward the right. By this movement, rod 80 increases the orifice to check valve 74, and rod 82 decreases the orifice to check valve 76 until the drop in pressures in passages 56 and 58 are equalized. During this movement, fluid flows through rod passages 85 and 87 to accommodate valve displacements at the end of the valve rods. If the load or other flow restricting condition applies to the opposite port 46, the corrective motion will be in the opposite direction.

When the valve rods 80 and 82 are in a neutral position, regardless of whether or not the flows are equal, the clearance or flow areas into the check valves are so great compared to the area of the metering orifices that there is little or no pressure drop at the valves. When one flow becomes greater than the other, it simply means there is less of a load on that particular cylinder, which is reflected in a lower back pressure in the equalizer valve. The resulting unequal flow results in a shift in the valve mechanism until this greater flow is reduced to equality with the other flow. This valving action is effective only because the resultant pressure drop at the restricting valve, added to the back pressure of its cylinder, equals the total back pressure of the cylinder having unrestricted flow. Since the flows through the metering orifices are equal, the pressure drops then will be equal. The equalizing action, once established, therefore, is dependent upon a pressure drop at the valve to maintain this action.

The operation in the "reverse" direction, when the valve re-combines flows, is as follows: Fluid flows into the valve through ports 44 and 46. The control metering in this case takes place also at piston 48. Instead of a pressure drop, however, the controlling pressure is back pressure at the orifice compared to a common exhaust pressure present in port 42. During this flow, check valves 74 and 76 are seated and fluid flows around valves 70 and 72, into bore 60 and up passages 56 and 58. Fluid pressure acts on flange 52 of piston 48, through a passage 55, forcing piston 48 downwardly. Fluid then escapes through the variable orifices formed by piston 48 at port 42.

The exhaust pressure in port 42 being common to both flows, the drop past piston 48 will increase the pressures in passages 56 and 58 by the amount of the drop. Since the drop increases with flow, the passage having the greatest flow will have the greatest pressure. This is just the opposite of the condition prevailing when valve 26 splits the flow. For this reason it is necessary to valve the flow at a different point with the movement of piston 78 in response to pressure.

Therefore, assuming the greater flow is in port 44, and consequently in passage 58, the larger pressure acts to move piston 78 to the left. This movement is just the opposite from that when the split flow through passage 58 is greater. The control is now effected by the rod 80 closing the clearance into recess 69. At the same time rod 80 increases the clearance into recess 66. This decreases the greater flow and increases the lesser flow until the two flows are equal. Thus the check valves change the direction of valve actuation when the flow is reversed.

During the combining flows, the cylinder with the least load will have an additional amount of fluid pressure, which will be exerted on its respective exhaust flow. This results in a greater flow, and a greater back pressure at the metering orifices, unbalancing the equalizer valve until the valve portion shifts to restrict the greater flow, thereby absorbing the additional amount of fluid pressure. The closing of the valve clearance of this flow of lesser load causes a pressure drop at the valve, which, subtracted from the exhaust pressure of this cylinder of lesser load, equals the exhaust pressure of the cylinder of the greater load. The flows being equal, the drops at the metering orifices will be equal. Thus the valves act to produce a pressure drop which maintains the equalizing action of the invention.

From the foregoing it is evident that the valves 80 and 82 are important, not only to restrict flow, but to create pressure drops which exactly compensate in the difference of loading of the two cylinders being equalized. When the valve splits the flow the pressure drop at the valve "builds up" the back pressure of the cylinder of lesser load. When the equalizer combines flows, the drop at the valve is subtracted from the exhaust pressure of the cylinder of lesser load, creating an equal usage of hydraulic energy in both cylinders, part of the energy being dissipated in work while the remainder, if any, is lost in pressure drop. If this "reverse" flow results in a greater flow in passage 56, this flow cannot depress piston 48, because the passage 55 is associated with flow passage 58. In this case, however, when the pressure in passage 58 is built up, piston 48 will be depressed and the metering action will take place. If there is any delay of pressure build-up in passage 58, this merely aids the equalizing function. When the flow is greater in passage 56, the piston 78 merely moves in the opposite direction.

Although the valve 26 is designed to equalize flows, it could readily be altered to produce flows in any given ratio to each other. Thus the metering orifices may be unequal in size, resulting in a permanent dislocation of valve actuation. More specifically, the orifices of the passages 56 and 58 in the wall of the cylinder 42 can be made of different dimensions so that when the piston 48 moves downwardly it will, in any given position, provide a larger opening into one passage than the other. As shown in Figs. 2 and 2A, the orifices of passages 56 and 58 are circular and of the same diameter to provide equal pressure drops in both passages. In the modification shown in Fig. 2B, the orifices are rectangular in shape, and the orifice 561 is wider than the orifice 581 so that for any given position of the piston 48, a larger flow is required through orifice 561 than through orifice 581 to produce equal pressure drops in the two passages. Where the orifices are of unequal dimensions, they should be rectangular and of the same height for the most accurate results so that the areas exposed by downward movement of the piston will bear the same ratio in all positions of the piston. However, such accuracy is not always required, and in some instances, it is satisfactory to make both orifices circular, but of different diameters.

The production embodiment of the equalizer valve of Figure 2 appears in Figures 3 through 6. Referring to Figures 3 and 4, the body of the valve is made in three portions, preferably castings, a central portion 100, a right hand portion 102 and a left hand portion 104. Center portion 100 contains a main port 106, and each side portion contains branch ports 108 and 110. Center portion 100 is longitudinally drilled at 111 with an internal step 112 near the center, and a transverse bore 114 intersects bore 111.

Placed in bore 111 is a flanged tubular member 116, pressed against shoulder 112 by a spring 118, held in place by an end plug 120. A cotter pin 122 keeps plug 120 from rotating, and plug 120 is slotted on its inner end to retain a leg of spring 118. The other end of spring 118 has a leg which fits into a groove 117 in tubular member 116. This arrangement of parts keeps tube 116 from rotating as it reciprocates back and forth.

The purpose of having sleeve 116 free from rotation is to insure that two drilled metering orifices therein, 124 and 126, will retain their alignment with transverse bore 114. Fitted in the lower end of tubular member 116 is a flanged piston member 128 urged toward member 116 by a spring 130 held by an end plug 132. It will be noted that piston 128 has a loose fit in its chamber and that its flange does not engage closely the walls in which it is placed. A small passage 133 connects bore 111 with transverse bore 114, to accommodate fluid displacements as piston 128 moves in bore 111, and to transmit the pressure in the bore 114 to the lower ends of tubular member 116 and piston 128.

Still referring to Figure 3, it will be noted that body portion 102 has a diagonal hole 134 communicating transverse bore 114 with a hole 136 at right angles thereto, and hole 136 communicates with a valve rod recess shown in broken outline. A similar inclined hole 138 in valve body portion 104 connects with a right angle hole 140, also connecting to the valve rod recess shown in dotted outline. In each body portion are check valve pairs 142 and 143, 144 and 145, each communicating with the valve rod recess and terminating in the branch ports 110 and 108.

Shown in Figure 5 is the manner of connecting valve bodies 104, 100, and 102. Central body portion 100 has a large transverse bore 146 into which project annular bosses 148 and 150 from body portion 104 and 102 respectively, each retaining a ring seal 149 and 151 to prevent leakage of fluid from bore 146. These members form a cyindrical chamber 147. Inclined bores 134 and 138 are similarly sealed by ring seals 152 and 153. It will also be noted that the upper ends of vertical bores 140 and 136 are sealed by threaded plugs 154 and 155.

Also shown in Figure 5 is the valve mechanism. Body members 104 and 102 have holes 156 and 158 which are coaxial. Each hole has annular enlargements 160 and 161, 162 and 163, communicating with their respective check valves. Placed in holes 156 and 158 and control bore 146 is an integral valve member including a piston portion 159 and valve rod portions 157 and 164 having annular reliefs 165 and 166 which are slightly greater in length than the least distance between the two annular recesses. In a neutral position the clearance into the recesses is about three hundredths of an inch which provides a considerable annular area. Each valve rod is axially drilled to communicate its end cavity with piston chamber 147. End plugs in the outer ends of bores 156 and 158 close them to atmosphere.

Figure 6 shows the construction of check valves 142 and 143, which is similar to that of check valves 144 and 145.

The operation of the valve of Figures 3 through 6 is similar to that of Figure 2, except for the action of the metering orifices 124 and 126. When fluid enters the valve at main port 106, it forces piston 128 outwardly from tubular member 116, uncovering metering orifices 124 and 126 by an amount depending on the fluid flow. When liquid enters ports 110 and 108 and leaves through port 106, piston 128 remains stationary, and liquid entering through hole 114 and passage 133 forces tubular member 116 away from piston 128, uncovering metering orifices 124 and 126. The result is similar to that of Figure 2, but this construction eliminates the air chamber and vent to atmosphere of Figure 2, and results in the application of net pressure forces to the metering piston 128 and to the tubular member 116 that are proportional to the pressure drop at orifice 126 and are independent of the absolute pressure in any part of the system.

The construction of the valving mechanism and the pressure responsive mechanisms is very important. A defect of prior equalizers has been the combining of valving and pressure responsive means into one member. Thus a sliding cylinder was exposed to differential pressures developed in the flow path of the fluid. The resulting pressure drops when restricting flow eliminates the effect of control pressures produced by a metering orifice.

In the present invention the pressure responsive mechanisms is entirely separate from the valve mechanism and one does not affect the other. The annular reliefs 165 and 166 on the valve rods form closed chambers with the valve housing insofar as transmitting pressure is concerned. This means that the valves are balanced at all times and this balance is not affected by valve movement due to the pressure responsive mechanism. The pressure responsive mechanism is responsive only to difference in the pressures in passages 136 and 140, and is not directly responsive to changing pressures caused by the valve action. As previously explained, the valves do affect the back pressures, but only to restore them to an equal basis so that the real control lies in the metering orifices.

Shown in Figure 7 is a modification of the metering orifice of Figure 3, which permits outside adjustment to get exact metering action. An adjustment of this type is very desirable in allowing greater manufacturing tolerances to the various ports controlling this necessarily accurate piece of mechanism. The principle is that of using a piston with an inclined head which piston may be rotated until a condition of equal flow through the metering orifices is reached.

A piston 128A has rectangular projections 190 on its flange. The piston 128A is held in place by a compression spring 130A resting on an end plug 132A of cup shape. Plug 132A has longitudinal slots 192 cut in its wall, and projections 190 of piston 128A fit in these slots 192. Thus, a splined connection is made between the plug and the piston. An external projection 194 on plug 132A is slotted to receive a screw driver. The head of piston 128A is inclined as at 196, which inclination may be as little as two degrees from a transverse axis.

The adjustment of the device of Figure 7 is done with a screw driver. The inlet port 106 of the equalizer valve is connected to a source of liquid and means to determine equal flow are connected to the branch ports. As the fluid passes through the equalizer, the plug 132A is rotated until the flow is equal. This adjustment is dependent upon the inclination 196 of the head of piston 128A. As the piston 128A rotates while depressed by fluid pressure, the inclination presents various surfaces to the orifices until a condition of equality is found as indicated by equal flows. The seal on plug 132A is compressed at all times and this seal holds the plug in the position to which it is rotated. Thus rotational alignment is maintained throughout the longitudinal stroke of piston 128A.

It is to be understood that although the most common use of the adjustable piston 196 is to balance the valve for equal flow in the two branches, it can also be used to intentionally unbalance the flow to a predetermined extent.

The invention has been described in detail in accordance with the patent statutes. It is not limited, however, to the specific embodiments described, nor otherwise, except by the terms of the following claims.

I claim:

1. A fluid flow system comprising a common line and a pair of branch lines merging with said common line at a junction and having flow resistance means in each branch adjacent the junction, and throttling means in each branch spaced from the junction responsive to departure of the pressures in the branches at points therein between the flow resistance means and the throttling means from a given ratio for varying said throttling means so as to nullify said departure and maintain the flows in the two branches in constant ratio; in which the throttling means in each branch comprises a pair of passages in parallel, check valve means restricting flow in the two passages to opposite directions, and a pair of throttling valves, one in each passage, simultaneously operable to close one passage while opening the other, and vice versa, the construction and arrangement of the throttling means being such that increase in the pressure in either one of the branches relative to the pressure in the other branch effects increased throttling in said one branch when the direction of flow is from the branches into said common line and effects decreased throttling in said one branch when the flow is from the common line into the branches.

2. A fluid flow system comprising a common line and a pair of branch lines merging with said common line at a junction and having flow resistance means in each branch adjacent the junction, and throttling means in each branch spaced from the junction responsive to departure of the pressures in the branches at points between the flow resistance means and the throttling means from a given ratio for varying said throttling means so as to nullify said departure and maintain the flows in the two branches in constant ratio; in which the throttling means in each branch comprises two passages in parallel, check valve means restricting flow in the two passages in opposite directions, and a pair of throttling valves, one passage while opening the other, and vice versa, the construction and arrangement of the throttling means being such that increase in the pressure in either one of the branches relative to the pressure in the other branch effects increased throttling in said one branch when the direction of flow is from the branches into said common line and effects decreased throttling in said one branch when the flow is from the common line into the branches, said flow resistance means comprising valve means for variably restricting said two branch lines simultaneously, spring means urging said valve means in closing direction, and means responsive to difference in pressure in either direction between said common line and one of said branch lines for opening said valve means.

3. A system as described in claim 1 in which said flow resistance means comprises a cylinder member having separate lateral passages communicating with said respective branch lines, a hollow piston sleeve fitted in said cylinder member for reciprocation therein and having lateral ports registering with said respective lateral passages at all times, means communicating one end of said sleeve with said common line, a piston reciprocable in said sleeve and adapted to cover and uncover the lateral ports therein, spring means urging said sleeve in one direction and spring means urging said piston in the opposite direction whereby said piston normally covers said ports in said sleeve, means for applying pressure from one of said branch lines to one end of said sleeve in opposition to the force exerted on said sleeve by its associated spring, the other end of the sleeve being exposed to pressure in said common line, the end of said piston opposite its associated spring means being exposed to the pressure of fluid in said common line and the other end being exposed to the pressure in said branch line, whereby relative movement between said piston and sleeve to uncover the ports in the sleeve is produced independently by pressure in said common line in excess of the pressure in said one branch line, and by pressure in said branch line in excess of the pressure in said common line.

4. A fluid flow system comprising a common line and a pair of branch lines merging with said common line at a junction, and having flow resistance means in each branch adjacent the junction, and having throttling means in each branch spaced from the junction responsive to departure of the pressures in the branches at points between the flow resistance means and the throttling means from a given ratio for varying said throttling means so as to nullify said departure and maintain the flows in the two branches in constant ratio; in which said flow resistance means comprise a cylinder member having one end connected to said common line and having two separate ports in its wall connected to said respective branch lines, a piston member in said cylinder member to variably uncover said ports in response to relative longitudinal movement between said members, spring means for urging one of said members in direction to cause said piston member to cover said ports, said one member being exposed to fluid pressure in said common line at one end and to fluid pressure in one of said branch lines at its opposite end, the edge of the piston member which covers and uncovers said ports being so slanted that the order in which said two ports are uncovered by the piston in response to said relative longitudinal movement varies according to the position of relative rotation between said members, means determining the position of relative rotation between said members, and means for adjusting said determining means to vary said position of relative rotation.

5. A fluid flow system comprising a common line and a pair of branch lines merging with said common line at a junction, and having flow resistance means in each branch adjacent the junction and having throttling means in each branch spaced from the junction responsive to departure of the pressures in the branches at points between the flow resistance means and the throttling means from a given ratio for varying said throttling means so as to nullify said departure and maintain the flows in the two branches in constant ratio; in which said flow resistance means comprises a cylinder having one end connected to said common line and the other end connected to one of said branch lines, and having two separate ports in its wall connected to said respective branch lines, a piston in said cylinder to variably uncover said ports in response to relative longitudinal movement thereof, spring means for urging said piston in direction to cover said ports, the edge of the piston which covers and uncovers said ports being so slanted that the order in which said two ports are uncovered in response to relative longitudinal movement between the piston and cylinder, varies according to the position of rotation of the piston, means determining the position of rotation of said piston while permitting free longitudinal movement thereof, and means for adjusting said determining means to vary the position of rotation of the piston.

6. A fluid flow system as described in claim 2 in which said flow resistance means comprises two reciprocable members, one of which has two separate ports in its wall connected to said respective branch lines and the other of which is adapted to variably uncover said ports in response to relative sliding movement between said members, said spring means urging said members in opposite directions to cover said ports, stop means limiting movements of said members in their port-closing directions, means responsive to difference in pressure in one direction between said common line and one of said branch lines for moving one of said members to uncover said ports, and means responsive to difference in pressure in the opposite direction between said common line and one of said branch lines for moving the other of said members to uncover said ports, whereby the same portions of said ports are initially uncovered irrespective of the direction of the pressure difference that causes the uncovering of the ports.

7. A fluid flow system comprising a common line and a pair of branch lines merging with said common line at a junction, and having flow resistance means in each branch adjacent the junction, and throttling means in each branch spaced from the junction responsive to departure of the pressures in the branches at points therein between the flow resistance means and the throttling means from a given ratio for increasingly throttling the flow in either one of said branches and decreasingly throttling the flow in the other branch in response to an increase in the pressure in said one branch relative to the pressure in the other branch, whereby the ratio of fluid flow from said branch lines into said common line is maintained substantially constant.

8. A fluid flow system comprising a common line having a pair of branches merging therewith at a junction, a pressure-actuated shuttle valve including a piston having opposite faces connected to said respective branches whereby it moves in one direction or the other in response to differential pressures in said branches, said shuttle valve having first and second pairs of throttling passages, one passage of each pair being in one branch and the other passage of each pair being in the other branch, said piston including means associated with said first pair of passages for increasingly throttling the passage in one branch and decreasingly throttling the passage in the other branch in response to increase of pressure in said one branch relative to that in the other branch and vice versa, said piston also including means associated with said second pair of passages for decreasingly throttling the passage in one branch and increasingly throttling the passage in the other branch in response to increase of pressure in said one branch relative to that in the other branch and vice versa, first means including check valve means for introducing an approximately constant pressure drop between said common line and said branches and confining fluid flow to said first pairs of passages when the direction of flow is from said common line into said branches, and second means including check valve means for producing an approximately constant pressure drop between said branches and said common line and confining flow to said second pair of passages when the direction of flow is from said branches into said common line.

9. Apparatus for proportioning the flow rates in a pair of branch ducts connected in parallel relation to each other and in series with a common duct containing means for circulating fluid in either direction therethrough, said apparatus comprising: first flow control means interconnecting said common duct with said branch ducts for dividing flow from the common duct into the branch ducts in predetermined ratio when the flow through said common duct is in one direction; second flow control means also interconnecting said common duct with said branch ducts for proportioning flows from the branch ducts into the common duct in a predetermined ratio when the flow through said common duct is in the opposite direction; and means for preventing flow from said branch ducts into said common duct through said first flow control means and preventing flow from said common duct into said branch ducts through said second flow control means.

WALTER C. TRAUTMAN.

REFERENCES CITED

The following references are of record in the file of this patent:

UNITED STATES PATENTS

| Number | Name | Date |
|---|---|---|
| 1,459,516 | Rohlin | June 19, 1923 |
| 1,999,834 | Ernst | Apr. 30, 1935 |
| 2,242,002 | Klein | May 13, 1941 |
| 2,266,921 | Trautman | Dec. 23, 1941 |
| 2,283,266 | Kinsella | May 19, 1942 |
| 2,365,095 | Miller | Dec. 12, 1944 |
| 2,437,113 | Montelius | Mar. 2, 1948 |